(No Model.)
J. FULTON.
BRAKE.
No. 399,515. Patented Mar. 12, 1889.
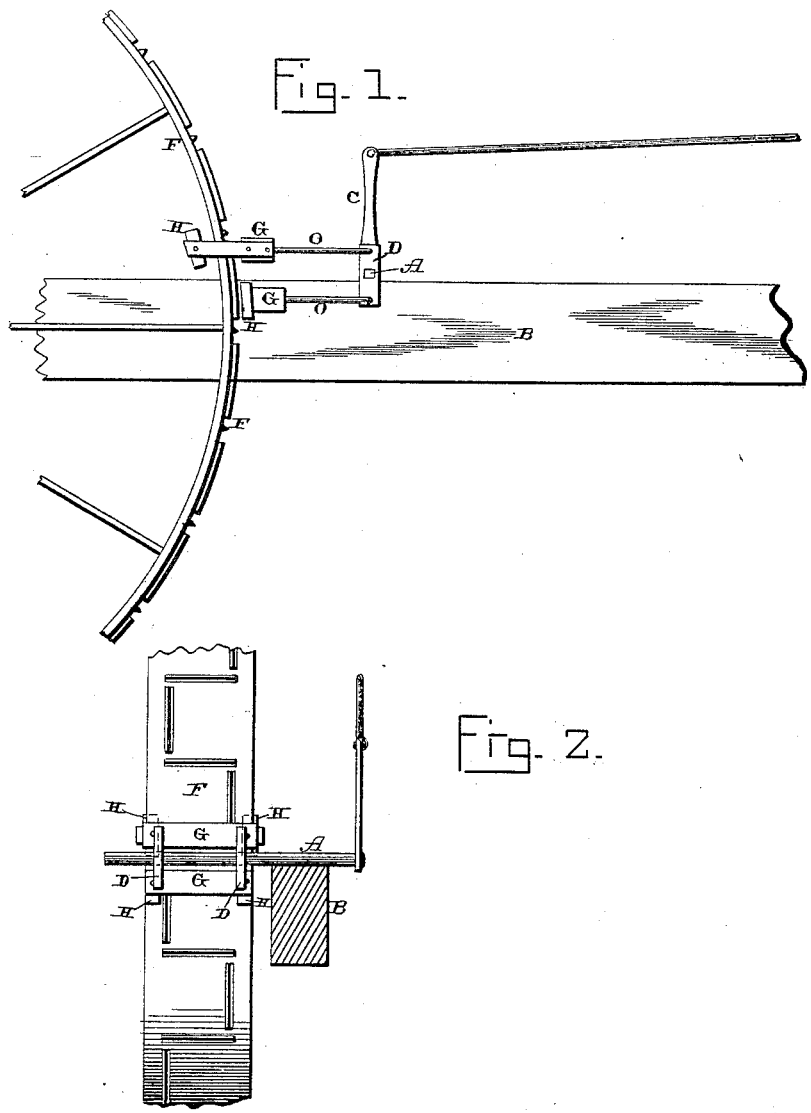
Witnesses:
E. P. Ellis,
L. L. Burket.
Inventor:
Jno. Fulton,
per
F. A. Lehmann,
atty.

United States Patent Office.

JOHN FULTON, OF BIGGS, OREGON.

BRAKE.

SPECIFICATION forming part of Letters Patent No. 399,515, dated March 12, 1889.

Application filed November 22, 1888. Serial No. 291,548. (No model.)

*To all whom it may concern:*

Be it known that I, JOHN FULTON, of Biggs, in the county of Wasco and State of Oregon, have invented certain new and useful Improvements in Brakes for Agricultural and other Machines of all Kinds; and I do hereby declare the following to be a full, clear, and exact description of the invention, such as will enable others skilled in the art to which it pertains to make and use it, reference being had to the accompanying drawings, which form part of this specification.

My invention relates to an improvement in brakes for agricultural and other machinery of all kinds; and it consists in the combination of a partially-rotating shaft which is operated at one end by a crank, arms which project at right angles from the shaft, brake-bars secured to the arms, and brakes secured to the bars and applied to opposite sides of the edge or periphery of the wheel, as will be more fully described hereinafter.

The object of my invention is to provide a brake which is adapted for headers and machinery of all kinds where a brake is required and in which the brake-blocks are applied to the inner and outer faces of the periphery of the wheel upon the same side, in contradistinction to blocks applied to the wheels upon opposite sides.

Figures 1 and 2 are elevations of a brake which embodies my invention, taken at right angles to each other.

A represents a shaft or roller, which extends across the frame B of the machine and which is provided with an operating-crank, C, at one end. Secured to this shaft near one end are the two arms D, which project from the shaft upon opposite edges of the wheel F, and to the outer ends of which arms are secured the brake-bars G, by means of the connecting-rods O, and to which bars the brake-blocks H are secured. Each arm D has two bars secured to it, and that bar which extends across the outer side of the wheel may extend from one to the other; but those bars placed inside of the edge of the wheel are made separate and distinct from each other, so as to allow the spokes of the wheel to revolve between them.

As will be seen, two of the brakes are applied to the outer edge or periphery of the wheel, and two of them are applied to its inner side, so that when the shaft A is partially rotated the two sets of brakes are forced against opposite sides of the periphery of the wheel, or withdrawn therefrom, according to the direction in which the shaft is turned. In proportion to the force applied to the crank, so the brakes may be made to clamp opposite sides of the periphery of the wheel and upon the same side of the wheel, in contradistinction to the brakes which have heretofore been applied to opposite sides of the wheel, require much longer rods, and producing a much weaker and less compact brake than is here shown.

The advantages of the construction here shown consist in the compactness of the parts, their strength, and the ease with which they can be operated.

Having thus described my invention, I claim—

In a brake, the combination of the operating-shaft provided with a crank, the arms projecting at right angles from the shaft, the brake-bars, the connecting-rods between the brake-bars and the arms, and the brakes which are applied to opposite sides of the periphery of the wheel upon its same side, substantially as shown.

In testimony whereof I affix my signature in presence of two witnesses.

JOHN FULTON.

Witnesses:
S. E. BARNETT,
W. M. BARNETT.